US012790951B2

(12) United States Patent
Akakuri et al.

(10) Patent No.: US 12,790,951 B2
(45) Date of Patent: Nov. 10, 2026

(54) TURBINE BLADE RING ASSEMBLY WITH A PLURALITY OF OVERLAPPING SPLIT PLATES AND METHOD FOR ASSEMBLING TURBINE

(71) Applicant: MITSUBISHI HEAVY INDUSTRIES, LTD., Tokyo (JP)

(72) Inventors: Kazuhiro Akakuri, Tokyo (JP); Hidekatsu Atsumi, Tokyo (JP); Naoki Goya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 148 days.

(21) Appl. No.: 18/860,150

(22) PCT Filed: Apr. 18, 2023

(86) PCT No.: PCT/JP2023/015402

§ 371 (c)(1),
(2) Date: Oct. 25, 2024

(87) PCT Pub. No.: WO2023/214507

PCT Pub. Date: Nov. 9, 2023

(65) Prior Publication Data

US 2026/0185453 A1 Jul. 2, 2026

(30) Foreign Application Priority Data

May 6, 2022 (JP) ................................ 2022-076507

(51) Int. Cl.

| | |
|---|---|
| ***F01D 11/00*** | (2006.01) |
| ***F01D 9/04*** | (2006.01) |
| ***F01D 11/02*** | (2006.01) |

(52) U.S. Cl.

CPC ............ *F01D 11/001* (2013.01); *F01D 9/042* (2013.01); *F01D 11/005* (2013.01); *F01D 11/02* (2013.01);

(Continued)

(58) Field of Classification Search

CPC .... F01D 11/001; F01D 11/003; F01D 11/005; F01D 11/02; F01D 9/04; F01D 9/042; F01D 25/246

(Continued)

(56) References Cited

U.S. PATENT DOCUMENTS 3,829,233 A * 8/1974 Scalzo .................. F01D 11/005 415/110
4,113,406 A * 9/1978 Lee ........................... F01D 5/08 415/115

(Continued)

FOREIGN PATENT DOCUMENTS

CN 204402578 U * 6/2015
CN 106089318 11/2016

(Continued)

OTHER PUBLICATIONS

English Translation of JP-2006132635-A (Year: 2006).*

(Continued)

*Primary Examiner* — Courtney D Heinle
*Assistant Examiner* — Esley Le Fisher
(74) *Attorney, Agent, or Firm* — Wenderoth, Lind & Ponack, L.L.P.

(57) ABSTRACT

A plurality of circumferentially-arranged split plates retained by a seal-ring retention ring include a plurality of first split-plate groups that are circumferentially arranged on one circumferential side of the seal-ring retention ring. The plurality of split plates constituting each of the first split-plate groups include: a first split plate; and a second split (Continued)

plate which is disposed at a location close to an end of the first split plate on the one circumferential side of the seal-ring retention ring and which is circumferentially adjacent to the first split plate. The first split plate has a one-side first overlapping portion that circumferentially overlaps the second split plate. The second split plate has an other-side second overlapping portion that circumferentially overlaps the one-side overlapping portion. The one-side first overlapping portion abuts against the other-side second overlapping portion by the first split plate being biased by a biasing spring.

14 Claims, 6 Drawing Sheets

(52) U.S. Cl.
CPC ...... *F05D 2230/60* (2013.01); *F05D 2240/40* (2013.01); *F05D 2260/38* (2013.01)

(58) Field of Classification Search
USPC ................................ 415/173.7, 174.3, 174.2
See application file for complete search history.

(56) References Cited

U.S. PATENT DOCUMENTS

| | | | | |
|---|---|---|---|---|
| 6,315,301 B1 * | 11/2001 | Umemura | F16J 9/14 277/589 |
| 6,558,114 B1 * | 5/2003 | Tapley | F01D 5/081 415/231 |
| 7,614,792 B2 * | 11/2009 | Wade | F16C 17/024 384/106 |
| 2016/0370163 A1 | 12/2016 | Waki et al. | |

FOREIGN PATENT DOCUMENTS

| | | | |
|---|---|---|---|
| CN | 207945297 | 10/2018 | |
| JP | 11-336506 | 12/1999 | |
| JP | 2002-115501 | 4/2002 | |
| JP | 2005-9410 | 1/2005 | |
| JP | 2006-132635 | 5/2006 | |
| JP | 2006132635 A * | 5/2006 | |
| JP | 2006-138250 | 6/2006 | |
| JP | 2010-77868 | 4/2010 | |
| JP | 2010-077869 | 4/2010 | |
| JP | 2010077868 A * | 4/2010 | |
| JP | 2013-181577 | 9/2013 | |
| JP | 2015-21735 | 2/2015 | |
| JP | 2019-090355 | 6/2019 | |
| JP | 2019-163755 | 9/2019 | |
| WO | WO-2019040171 A1 * | 2/2019 | F16J 15/0887 |

OTHER PUBLICATIONS

English Translation of CN-204402578-U (Year: 2015).*
English Translation of JP-2010077868-A (Year: 2010).*
International Search Report issued Jun. 6, 2023 in International Application No. PCT/JP2023/015402.
International Preliminary Report on Patentability issued Nov. 21, 2024 in International Application No. PCT/JP2023/015402, with English translation.

* cited by examiner

TURBINE BLADE RING ASSEMBLY WITH A PLURALITY OF OVERLAPPING SPLIT PLATES AND METHOD FOR ASSEMBLING TURBINE

TECHNICAL FIELD

The present disclosure relates to a turbine blade ring assembly and a method for assembling a turbine.

The present application claims priority based on Japanese Patent Application No. 2022-076507 filed in Japan on May 6, 2022, the contents of which are incorporated herein by reference.

BACKGROUND ART

For example, a turbine in a gas turbine includes a turbine blade ring including a blade ring in which a plurality of stator blades are retained and a seal-ring retention ring. The turbine blade ring is configured such that cooling air is introduced into a space between an inner side of the stator blade and the seal-ring retention ring (for example, refer to PTL 1).

CITATION LIST

Patent Literature

[PTL 1] Japanese Unexamined Patent Application Publication No. 2010-077869

SUMMARY OF INVENTION

Technical Problem

For example, in a turbine blade ring described in PTL 1, a buffer plate (split plate) attached to a seal-ring retention ring is configured to be biased by a spring to abut against a protrusion portion protruding from an inner shroud to a radial inner side.

In such split plates, generally, split plates adjacent to each other in a circumferential direction are shiplap-joined to be capable of being separated from each other or abutted against each other.

In the turbine blade ring having such a configuration, when a turbine is assembled, there is a step of attaching a blade ring upper-half portion in which a plurality of stator blades are retained from a radial outer side of a seal-ring retention ring upper-half portion retaining a plurality of the split plates disposed in the circumferential direction. In this step, the protrusion portion protruding from the inner shroud to the radial inner side overlaps and is fitted to the split plate in a radial direction while pressing and moving the split plate in an axial direction against a biasing force of the spring. In this case, the protrusion portion presses the split plates in the axial direction in order from a split plate positioned at a position close to a horizontal split surface.

Therefore, in the above step, the protrusion portion may be caught and stranded on the split plate, and the blade ring upper-half portion may not be capable of being smoothly accommodated. Therefore, implementation of the above step may take time.

At least one embodiment of the present disclosure is to provide a turbine blade ring assembly and a method for assembling a turbine capable of efficiently performing assembly work of a turbine in view of the above-described circumstances.

Solution to Problem (1) A turbine blade ring assembly according to at least one embodiment of the present disclosure includes a blade ring having an arc shape, a plurality of stator blades retained by the blade ring, a seal-ring retention ring having an arc shape, a plurality of split plates retained by the seal-ring retention ring and disposed in a circumferential direction, and a plurality of biasing springs that bias the plurality of split plates in an axial direction, in which the plurality of stator blades have protrusion portions protruding to a radial inner side, the plurality of biasing springs bias the plurality of split plates to abut against the protrusion portions, the plurality of split plates include a first split-plate group in which the plurality of split plates are disposed in the circumferential direction on one side in the circumferential direction of the seal-ring retention ring, and a second split-plate group in which the plurality of split plates are disposed in the circumferential direction on the other side in the circumferential direction of the seal-ring retention ring, the plurality of split plates constituting the first split-plate group include first split plates, and second split plates disposed at positions close to an end portion on the one side in the circumferential direction of the seal-ring retention ring with respect to the first split plates and adjacent to the first split plates in the circumferential direction, the first split plates have one-side first overlapping portions overlapping the second split plates in the circumferential direction, the second split plates have other-side second overlapping portions overlapping the one-side first overlapping portions in the circumferential direction, the one-side first overlapping portions abut against the other-side second overlapping portions via the first split plates being biased by the biasing spring, the plurality of split plates constituting the second split-plate group include third split plates, and fourth split plates disposed at positions close to an end portion on the other side in the circumferential direction of the seal-ring retention ring with respect to the third split plates and adjacent to the third split plates in the circumferential direction, the third split plates have other-side third overlapping portions overlapping the fourth split plates in the circumferential direction, the fourth split plates have one-side fourth overlapping portions overlapping the other-side third overlapping portions in the circumferential direction, and the other-side third overlapping portions abut against the one-side fourth overlapping portions via the third split plates being biased by the biasing spring.

(2) A method for assembling a turbine according to at least one embodiment of the present disclosure includes a step of attaching a seal-ring retention ring upper-half portion including a plurality of split plates disposed in a circumferential direction and a plurality of biasing springs that bias the plurality of split plates in an axial direction to a casing lower half to which a turbine blade ring lower-half portion including a blade ring in which a plurality of stator blades are retained and a seal-ring retention ring is attached, and a step of attaching a blade ring upper-half portion in which the plurality of stator blades are retained to the seal-ring retention ring upper-half portion attached to the casing lower half, in which the plurality of stator blades included in the blade ring upper-half portion have protrusion portions protruding to a radial inner side, the plurality of biasing springs included in the seal-ring retention ring upper-half portion bias the plurality of split plates included in the seal-ring retention ring upper-half portion to abut against the protrusion portions, the plurality of split plates included in the seal-ring retention ring upper-half portion include a first split-plate group in which the plurality of split plates are disposed in the circumferential direction on one side in the circumferential direction of the seal-ring retention ring, and a second split-plate group in which the plurality of split plates are disposed in the circumferential direction on the other side in the circumferential direction of the seal-ring retention ring, the plurality of split plates constituting the first split-plate group include first split plates, and second split plates disposed at positions close to an end portion on the one side in the circumferential direction of the seal-ring retention ring with respect to the first split plates and adjacent to the first split plates in the circumferential direction, the first split plates have one-side first overlapping portions overlapping the second split plates in the circumferential direction, the second split plates have other-side second overlapping portions overlapping the one-side first overlapping portions in the circumferential direction, the one-side first overlapping portions abut against the other-side second overlapping portions via the first split plates being biased by the biasing spring, the plurality of split plates constituting the second split-plate group include third split plates, and fourth split plates disposed at positions close to an end portion on the other side in the circumferential direction of the seal-ring retention ring with respect to the third split plates and adjacent to the third split plates in the circumferential direction, the third split plates have other-side third overlapping portions overlapping the fourth split plates in the circumferential direction, the fourth split plates have one-side fourth overlapping portions overlapping the other-side third overlapping portions in the circumferential direction, and the other-side third overlapping portions abut against the one-side fourth overlapping portions via the third split plates being biased by the biasing spring.

Advantageous Effects of Invention

According to at least one embodiment of the present disclosure, assembly work of a turbine can be efficiently performed.

DESCRIPTION OF EMBODIMENTS

Figure 1:
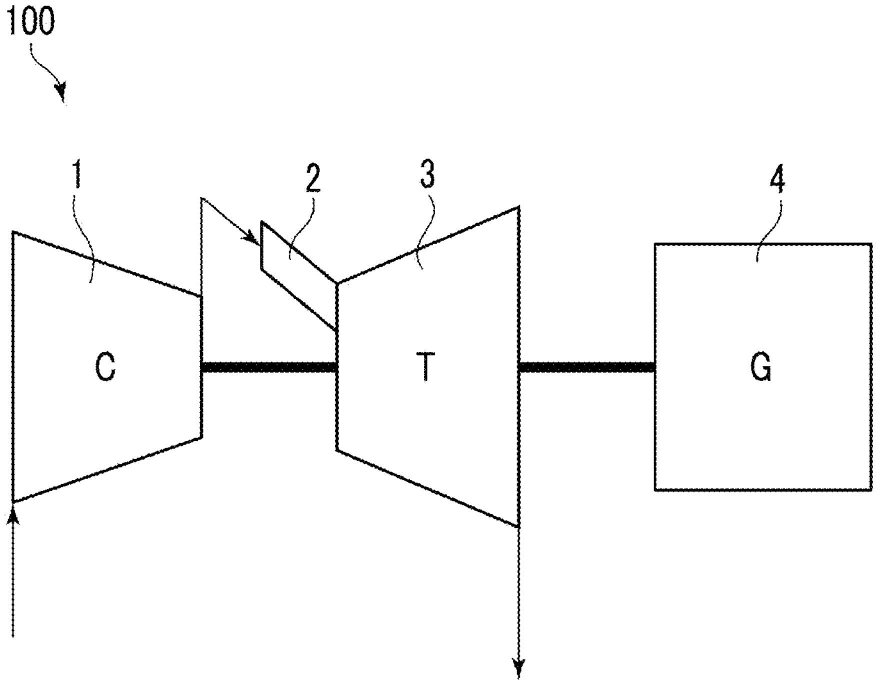
FIG. 1 is a schematic view showing a configuration of a gas turbine including a turbine blade ring assembly according to one embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the present disclosure, but are merely explanatory examples.

For example, an expression representing a relative or absolute arrangement such as “in a certain direction”, “along a certain direction”, “parallel”, “orthogonal”, “center”, “concentric”, or “coaxial” does not strictly represent only such an arrangement, but also a tolerance or a state of being relatively displaced with an angle or a distance to the extent that the same function can be obtained.

For example, expressions such as “identical”, “equal”, and “homogeneous”, which indicate that things are in the same state, not only represent a state of being strictly equal, but also represent a state in which there is a tolerance, or a difference to the extent that the same function can be obtained.

For example, an expression indicating a shape such as a square shape or a cylindrical shape not only represents a shape such as a square shape or a cylindrical shape in a geometrically strict sense, but also represents a shape that includes concave and convex portions, chamfered portions, or the like to the extent that the same effects can be obtained.

Meanwhile, an expression such as “comprising”, “possessing”, “provided with”, “including”, or “having” one component is not an exclusive expression excluding the presence of other components.

Hereinafter, a gas turbine including a turbine blade ring assembly according to one embodiment will be described in detail with reference to the drawings.

FIG. 1 is a schematic view showing a configuration of a gas turbine including a turbine blade ring assembly according to one embodiment.

Figure 2:
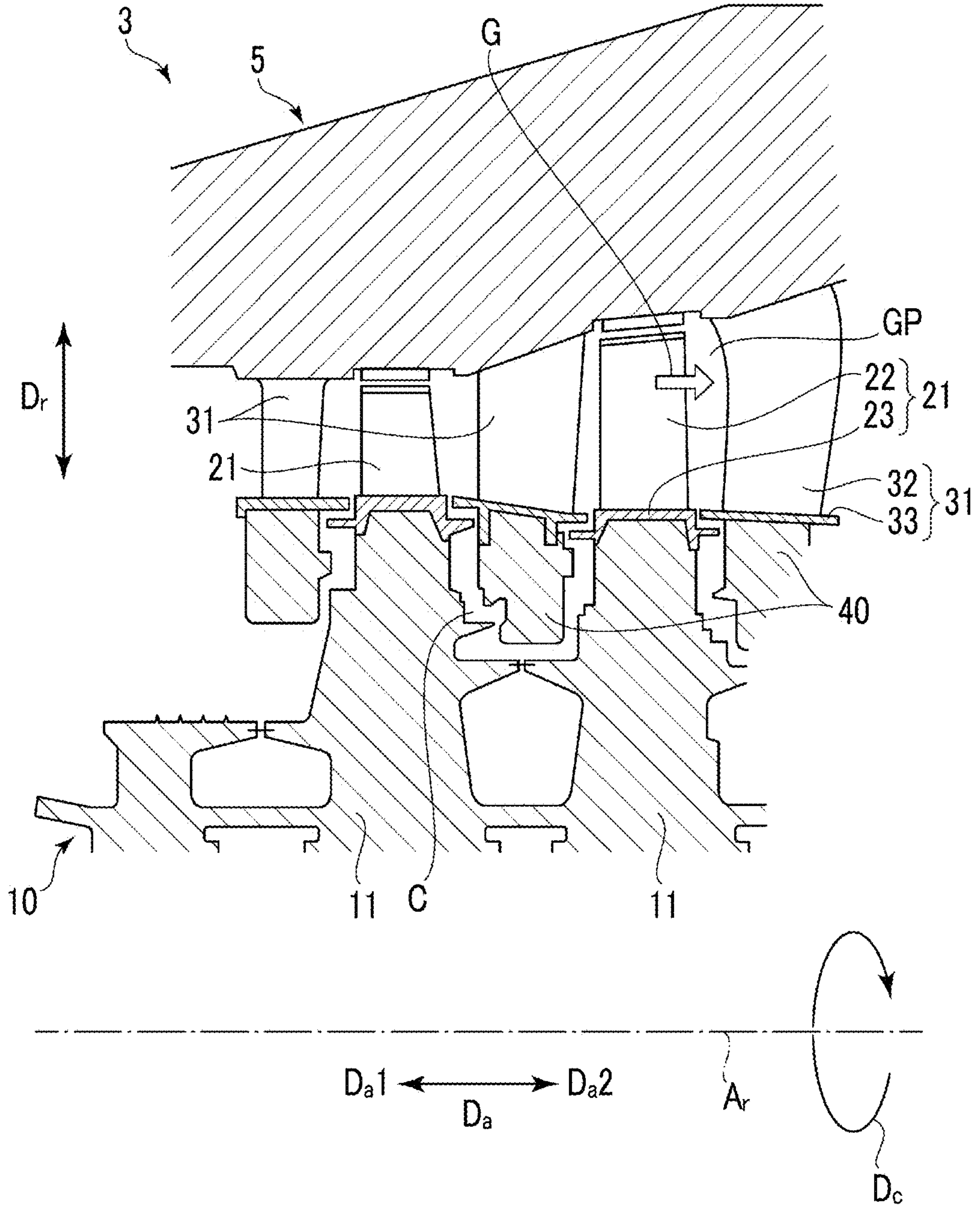
FIG. 2 is a sectional view of a main portion of a gas turbine of the present embodiment.

FIG. 2 is a sectional view of a main portion of a gas turbine of the present embodiment.

Figure 3:
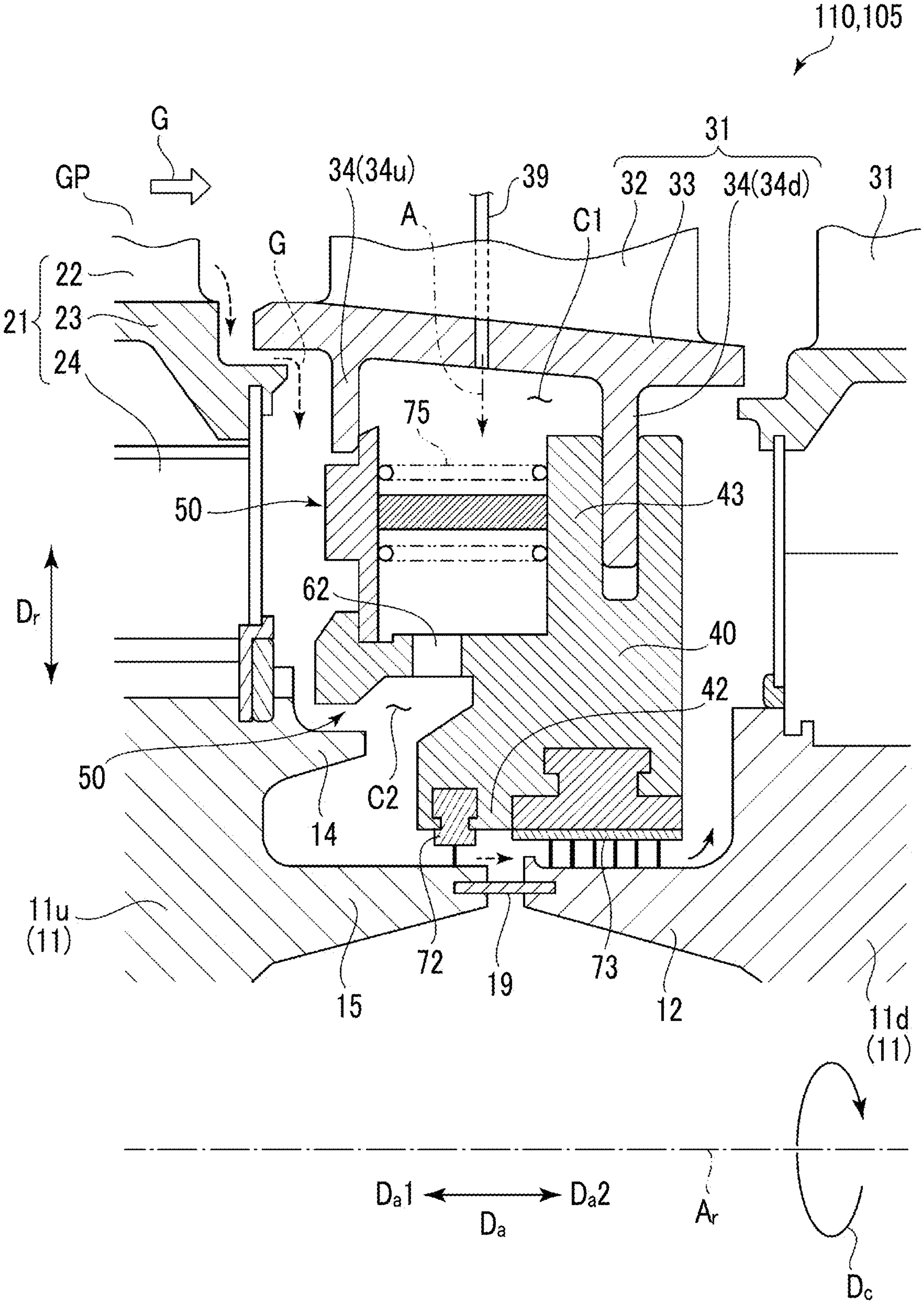
FIG. 3 is a detailed sectional view of a rotor disk and a seal-ring retention ring in FIG. 2.

FIG. 3 is a detailed sectional view of a rotor disk and a seal-ring retention ring in FIG. 2.

Figure 4:
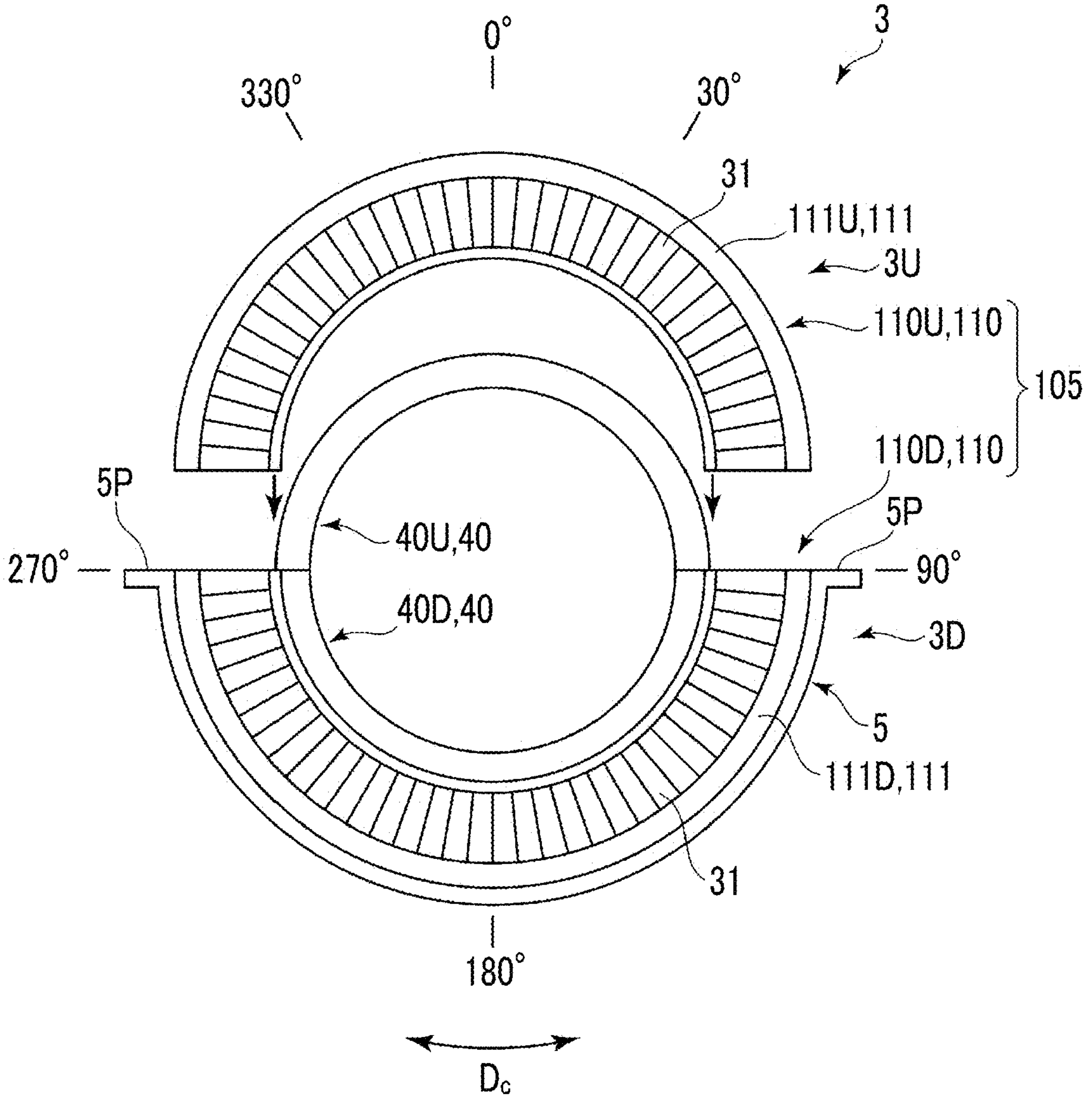
FIG. 4 is a view of the turbine blade ring assembly according to one embodiment as viewed from an upstream side in an axial direction.

FIG. 4 is a view of the turbine blade ring assembly according to one embodiment as viewed from an upstream side in an axial direction, and shows a state in the middle of attaching the turbine blade ring assembly to a turbine.

As shown in FIG. 1, a gas turbine 100 of the present embodiment includes a compressor 1 that compresses outside air to generate compressed air, a plurality of combustors 2 that combust fuel supplied from a fuel supply source (not shown) by mixing the fuel and the compressed air to generate combustion gas, and a turbine 3 that is driven by the combustion gas.

As shown in FIG. 2, the turbine 3 includes a rotor 10 that rotates around an axis Ar, and a casing 5 that covers the rotor 10 to be rotatable. For example, a generator 4 (see FIG. 1) that generates power via the rotation of the rotor 10 is connected to the rotor 10. Hereinafter, a direction in which the axis Ar of the rotor 10 extends is referred to as an axial direction Da. A side closer to the axis Ar in a radial direction Dr of the axis Ar will be referred to as a radial inner side, and a side away from the axis Ar will be referred to as a radial outer side.

The rotor 10 includes a plurality of stages of rotor disks 11 that are overlapped in the axial direction Da, and a plurality of rotor blades 21 that are fixed to each stage of the rotor disks 11 and that are arranged in a circumferential direction Dc of the axis Ar.

A plurality of stator blades 31 are fixed to an inner periphery of the casing 5 to correspond to the plurality of rotor blades 21 of each stage via a blade ring 111 (to be described later) shown in FIG. 4. The plurality of stator blades 31 of each stage are disposed side by side in the circumferential direction Dc of the axis Ar.

A seal-ring retention ring 40 is fixed to a radial inner side of the plurality of stator blades 31 of each stage.

As shown in FIG. 3, the rotor disk 11 for each of a plurality of the stages is provided with an upstream-side rim portion 12 protruding to an upstream side Da1 in the axial direction Da, and a seal arm 14 and a downstream-side rim portion 15 which protrude to a downstream side Da2 in the axial direction Da. The downstream-side rim portion 15 of the rotor disk 11 is positioned on the radial inner side with respect to the seal arm 14, and faces the upstream-side rim portion 12 of a downstream-side rotor disk 11*d* adjacent to the downstream side Da2 of the rotor disk 11.

An air baffle 19 is provided between the downstream-side rim portion 15 of an upstream-side rotor disk 11*u* and the upstream-side rim portion 12 of the downstream-side rotor disk 11*d*.

The rotor blade 21 fixed to the rotor disk 11 includes a rotor blade main body 22 extending in the radial direction Dr, a platform 23 provided on a radial inner side of the rotor blade main body 22, a shank 24 provided on a radial inner side of the platform 23, and a blade root (not shown) provided on a radial inner side of the shank 24. The rotor blade 21 is fixed to the rotor disk 11 by inserting the blade root of the rotor blade 21 into the rotor disk 11.

The stator blade 31 fixed to the casing 5 via the blade ring 111 includes a stator blade main body 32 extending from the blade ring 111 to the radial inner side, an inner shroud 33 provided on a radial inner side of the stator blade main body 32, and a pair of leg portions (protrusion portions) 34 extending from the inner shroud 33 to the radial inner side. That is, the blade ring 111 retains the plurality of stator blades 31 disposed in the circumferential direction Dc.

A first cavity C1 extending in the circumferential direction Dc is formed by the inner shroud 33 and the seal-ring retention ring 40.

In addition, a second cavity C2 extending in the circumferential direction De is formed by the downstream-side rim portion 15 of the upstream-side rotor disk 11*u* and the seal-ring retention ring 40.

The first cavity C1 and the second cavity C2 communicate with each other via a plurality of through-holes 62 formed in the seal-ring retention ring 40. The plurality of through-holes 62 are provided at intervals in the circumferential direction Dc.

In the stator blade main body 32, a compressed air supply line 39 for supplying a part of compressed air A (cooling gas) that is bled from a middle of the compressor 1 (refer to FIG. 1) to the inner shroud 33 to cool the stator blade 31 is disposed to penetrate the stator blade main body 32 in the radial direction Dr. An end portion of the compressed air supply line 39 is open in the first cavity C1.

As shown in FIG. 2, a space surrounded by a surface on a radial outer side of the inner shroud 33 of the stator blade 31, a surface on a radial outer side of the platform 23 of the rotor blade 21, and an inner peripheral surface of the casing 5 is a combustion gas passage GP through which combustion gas G from the combustor 2 flows.

As shown in FIG. 3, on a radial inner side of the seal-ring retention ring 40, a seal ring 72 that seals a space between the seal-ring retention ring 40 and the downstream-side rim portion 15 of the upstream-side rotor disk 11*u* and a seal ring 73 that seals a space between the seal-ring retention ring 40 and the upstream-side rim portion 12 of the downstream-side rotor disk 11D are provided.

The seal-ring retention ring 40 according to one embodiment is provided with a connecting portion 43 that is connected to a leg portion 34*d* on the downstream side Da2 (axial downstream side Da2) in the axial direction Da of the pair of leg portions 34 of the inner shroud 33, on a radial outer side of the seal-ring retention ring 40.

In addition, a plurality of split plates 50 that are connected to a leg portion 34*u* on the upstream side Da1 (axial upstream side Da1) in the axial direction Da of the pair of leg portions 34 of the inner shroud 33 are attached to the seal-ring retention ring 40 according to one embodiment, on the radial outer side of the seal-ring retention ring 40. Each of the plurality of split plates 50 is biased toward the axial upstream side Da1 by a biasing spring 75, and a region on the radial outer side on a surface on the axial upstream side Da1 presses a surface of the leg portion 34*u* of the inner shroud 33 on the axial downstream side Da2 toward the axial upstream side Da1.

Details of the split plate 50 will be described later.

The turbine 3 according to one embodiment includes a turbine blade ring assembly 110 according to one embodiment. The turbine blade ring assembly 110 according to one embodiment includes the blade ring 111 having an arc shape, the plurality of stator blades 31 retained by the blade ring 111, the seal-ring retention ring 40 having an arc shape, the plurality of split plates 50 retained by the seal-ring retention ring 40 and disposed in the circumferential direction Dc, and a plurality of the biasing springs 75 that bias the plurality of split plates 50 in the axial direction Da.

As shown in FIG. 4, the turbine 3 according to one embodiment includes the turbine blade ring assembly 110 (upper-half portion 110U) disposed in an upper-half portion 3U of the turbine 3, and the turbine blade ring assembly 110 (lower-half portion 110D) disposed in a lower-half portion 3D of the turbine 3.

In the turbine 3 according to one embodiment, a turbine blade ring 105 is configured by the turbine blade ring assembly 110 (upper-half portion 110U) disposed in the upper-half portion 3U of the turbine 3 and the turbine blade ring assembly 110 (lower-half portion 110D) disposed in the lower-half portion 3D of the turbine 3.

The blade ring 111 includes an upper-half portion 111U disposed in the upper-half portion 3U of the turbine 3, and a lower-half portion 111D disposed in the lower-half portion 3D of the turbine 3.

The seal-ring retention ring 40 includes an upper-half portion 40U disposed in the upper-half portion 3U of the turbine 3, and a lower-half portion 40D disposed in the lower-half portion 3D of the turbine 3.

Next, an operation of the gas turbine 100 of the present embodiment will be described.

The high-temperature and high-pressure combustion gas G introduced from the combustor 2 passes through the combustion gas passage GP, and comes into contact with the rotor blade 21 in the process, so that the rotor 10 having the rotor blade 21 is rotated around the axis Ar.

In addition, the compressed air A (one-dot chain line) supplied to the compressed air supply line 39 provided in the stator blade 31 from an outer side of the casing 5 passes through the first cavity C1 and is discharged into the second cavity C2 via the through-hole 62. The compressed air A is made uniform in the second cavity C2 in the circumferential direction Dc, and a part of the compressed air A leaks to the upstream side Da1 and is discharged into the combustion gas passage GP. In addition, a part of the compressed air A leaks from the seal rings 72 and 73 and is discharged into the combustion gas passage GP. Accordingly, the leakage of the combustion gas G into a gap between the stator blade 31 and the rotor 10 is prevented.

(Split Plate 50)

Figure 5:
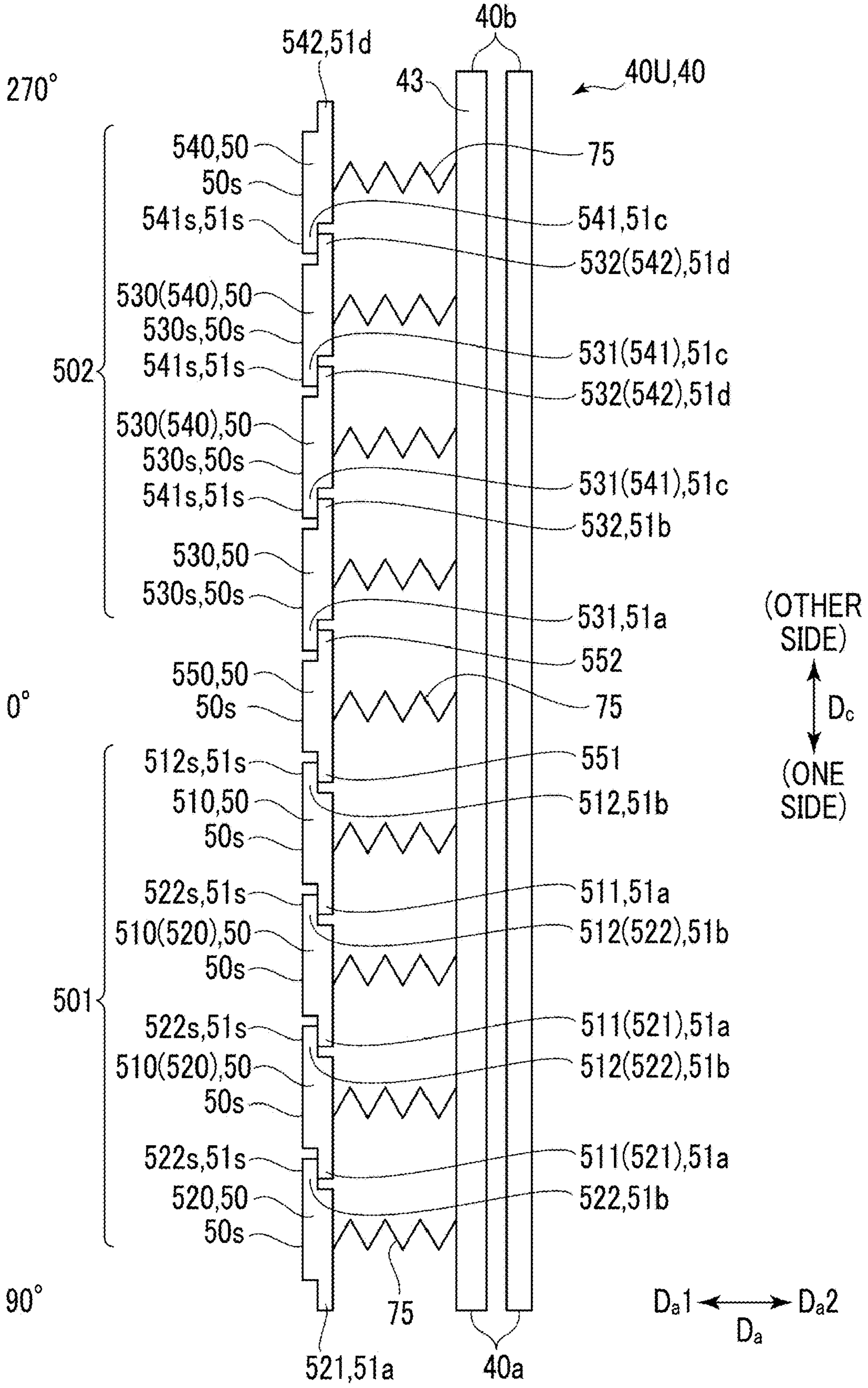
FIG. 5 is a schematic view in which the seal-ring retention ring is expanded in a circumferential direction in order to describe a disposition of split plates.

FIG. 5 is a schematic view in which the seal-ring retention ring 40 according to one embodiment is expanded in the circumferential direction Dc in order to describe a disposition of the split plates 50 when the seal-ring retention ring 40 is viewed from the radial outer side. In FIG. 5, the turbine blade ring assembly 110 (upper-half portion 110U) disposed in the upper-half portion 3U of the turbine 3 will be described as an example.

Each of the split plates 50 is a plate-like member extending in the circumferential direction Dc, and an overlapping portion 51 overlapping the other split plate 50 in the circumferential direction Dc, which is adjacent to the split plate 50 in the circumferential direction De, is formed at an end portion in the circumferential direction Dc.

For convenience of description, in the following description, in FIG. 4 in which the turbine blade ring assembly 110 according to one embodiment is viewed from the upstream side in the axial direction Da, a direction of twelve o'clock is defined as 0 degrees, and an angular position is defined with a clockwise direction as positive. A direction of three o'clock (direction of 90 degrees) when viewed from a position of twelve o'clock (position of 0 degrees) is defined as one side in the circumferential direction Dc, and a direction of nine o'clock (direction of 270 degrees) when viewed from the position of twelve o'clock (position of 0 degrees) is defined as the other side in the circumferential direction Dc.

In the turbine blade ring assembly 110 according to one embodiment, the plurality of split plates 50 include a first split-plate group 501 in which the plurality of split plates 50 are disposed in the circumferential direction Dc on the one side in the circumferential direction Dc of the seal-ring retention ring 40, and a second split-plate group 502 in which the plurality of split plates 50 are disposed in the circumferential direction Dc on the other side in the circumferential direction Dc of the seal-ring retention ring 40.

(First Split-Plate Group 501)

The plurality of split plates 50 constituting the first split-plate group 501 include first split plates 510, and second split plates 520 disposed at positions close to an end portion on the one side in the circumferential direction Dc of the seal-ring retention ring 40 with respect to the first split plates 510 and adjacent to the first split plates 510 in the circumferential direction Dc.

The first split plates 510 include one-side first overlapping portions 511 formed at end portions on the one side in the circumferential direction Dc and overlapping the second split plates 520 in the circumferential direction Dc, and other-side first overlapping portions 512 formed at end portions on the other side in the circumferential direction Dc.

The second split plates 520 include one-side second overlapping portions 521 formed at the end portions on the one side in the circumferential direction Dc, and other-side second overlapping portions 522 formed at the end portions on the other side in the circumferential direction Dc and overlapping the one-side first overlapping portions 511 of the first split plates 510 in the circumferential direction Dc.

In the turbine blade ring assembly 110 according to one embodiment, the one-side first overlapping portions 511 of the first split plates 510 abut against the other-side second overlapping portions 522 of the second split plates 520 via the first split plates 510 being biased by the biasing spring 75.

A relationship between the first split plates 510 and the second split plates 520 described above is applicable to any two split plates 50 adjacent to each other in the circumferential direction Dc among the plurality of split plates 50 included in the first split-plate group 501. Therefore, a split plate 50 that is the second split plate 520 in two split plates 50 adjacent to each other in the circumferential direction Dc is the first split plate 510 with respect to a split plate 50 that is disposed adjacent to the split plate 50 on the one side in the circumferential direction Dc.

That is, among the plurality of split plates 50 included in the first split-plate group 501, split plates other than split plates 50 at both ends in the circumferential direction Dc may be either the first split plate 510 or the second split plate 520 depending on a positional relationship with the other split plates 50 in the circumferential direction Dc.

In the turbine blade ring assembly 110 according to one embodiment, the plurality of split plates 50 included in the first split-plate group 501 may all have the same shape, for example, except for a length in the circumferential direction Dc, or may all have the same shape including the length in the circumferential direction Dc.

That is, the plurality of split plates 50 included in the first split-plate group 501 include one-side overlapping portions 51*a* formed at the end portions on the one side in the circumferential direction Dc, and other-side overlapping portions 51*b* formed at the end portions on the other side in the circumferential direction Dc.

In the turbine blade ring assembly 110 according to one embodiment, the one-side first overlapping portions 511 and the other-side second overlapping portions 522 are shiplap-joined to be capable of being separated from each other or abutted against each other.

That is, the plurality of split plates 50 included in the first split-plate group 501 are configured to be capable of being meshed with each other and shiplap-joined to each other by the one-side overlapping portions 51*a* and the other-side overlapping portions 51*b*.

In the plurality of split plates 50 included in the first split-plate group 501, the one-side overlapping portions 51*a* and the other-side overlapping portions 51*b* protrude in the circumferential direction Dc to configure a halving joint. The one-side overlapping portions 51*a* have a shape in which the axial upstream side Da1 is cut out, and the other-side overlapping portions 51*b* have a shape in which the axial downstream side Da2 is cut out.

In the plurality of split plates 50 included in the first split-plate group 501, the one-side overlapping portions 51*a* and the other-side overlapping portions 51*b* may be formed to configure an inclination joint having an inclined surface inclined such that a dimension in the axial direction Da gradually decreases toward an end portion side in the circumferential direction Dc.

In the plurality of split plates 50 included in the first split-plate group 501 according to one embodiment, surfaces 51*s* facing the axial upstream side Da1 in the other-side overlapping portions 51*b* and surfaces 50*s* facing the axial upstream side Da1 in a region on the one side in the circumferential direction Dc from the other-side overlapping portions 51*b* may be flush with each other.

In addition, in the plurality of split plates 50 included in the first split-plate group 501 according to one embodiment, surfaces 522*s* (surfaces 51*s*) facing the axial upstream side Da1 in the other-side second overlapping portions 522

(other-side overlapping portions 51*b*) of the second split plates 520 and surfaces 510*s* (surfaces 50*s*) facing the axial upstream side Da1 in the first split plates 510 may be flush with each other.

As a result, as will be described later, in a step of attaching the upper-half portion 111U of the blade ring 111 in which the plurality of stator blades 31 are retained to the upper-half portion 40U of the seal-ring retention ring 40 attached to the turbine 3, the leg portion 34 is less likely to be caught on the split plate 50, and the upper-half portion 111U of the blade ring 111 can be smoothly accommodated.

(Second Split-Plate Group 502)

The plurality of split plates 50 constituting the second split-plate group 502 include third split plates 530, and fourth split plates 540 disposed at positions close to an end portion on the other side in the circumferential direction Dc of the seal-ring retention ring 40 with respect to the third split plates 530 and adjacent to the third split plates 530 in the circumferential direction Dc.

The third split plates 530 include one-side third overlapping portions 531 formed at the end portions on the one side in the circumferential direction Dc, and other-side third overlapping portions 532 formed at the end portions on the other side in the circumferential direction Dc and overlapping the fourth split plates 540 in the circumferential direction Dc.

The fourth split plates 540 include one-side fourth overlapping portions 541 formed at the end portions on the one side in the circumferential direction Dc and overlapping the other-side third overlapping portions 532 of the third split plates 530 in the circumferential direction Dc, and other-side fourth overlapping portions 542 formed at the end portions on the other side in the circumferential direction Dc.

In the turbine blade ring assembly 110 according to one embodiment, the other-side third overlapping portions 532 of the third split plates 530 abut against the one-side fourth overlapping portions 541 of the fourth split plates 540 via the third split plates 530 being biased by the biasing spring 75.

A relationship between the third split plates 530 and the fourth split plates 540 described above is applicable to any two split plates 50 adjacent to each other in the circumferential direction Dc among the plurality of split plates 50 included in the second split-plate group 502. Therefore, a split plate 50 that is the fourth split plate 540 in two split plates 50 adjacent to each other in the circumferential direction Dc is the third split plate 530 with respect to a split plate 50 that is disposed adjacent to the split plate 50 on the other side in the circumferential direction Dc.

That is, among the plurality of split plates 50 included in the second split-plate group 502, split plates other than split plates 50 at both ends in the circumferential direction Dc may be either the third split plate 530 or the fourth split plate 540 depending on a positional relationship with the other split plates 50 in the circumferential direction Dc.

In the turbine blade ring assembly 110 according to one embodiment, the plurality of split plates 50 included in the second split-plate group 502 may all have the same shape, for example, except for a length in the circumferential direction Dc, or may all have the same shape including the length in the circumferential direction Dc.

That is, the plurality of split plates 50 included in the second split-plate group 502 include one-side overlapping portions 51*c* formed at the end portions on the one side in the circumferential direction Dc, and other-side overlapping portions 51*d* formed at the end portions on the other side in the circumferential direction Dc.

In the turbine blade ring assembly 110 according to one embodiment, the other-side third overlapping portions 532 and the one-side fourth overlapping portions 541 are shiplap-joined to be capable of being separated from each other or abutted against each other.

That is, the plurality of split plates 50 included in the second split-plate group 502 are configured to be capable of being meshed with each other and shiplap-joined to each other by the one-side overlapping portions 51*c* and the other-side overlapping portions 51*d*.

In the plurality of split plates 50 included in the second split-plate group 502, the one-side overlapping portions 51*c* and the other-side overlapping portions 51*d* protrude in the circumferential direction Dc to configure a halving joint. The one-side overlapping portions 51*c* have a shape in which the axial downstream side Da2 is cut out, and the other-side overlapping portions 51*d* have a shape in which the axial upstream side Da1 is cut out.

In the plurality of split plates 50 included in the second split-plate group 502, the one-side overlapping portions 51*c* and the other-side overlapping portions 51*d* may be formed to configure an inclination joint having an inclined surface inclined such that a dimension in the axial direction Da gradually decreases toward an end portion side in the circumferential direction Dc.

In the plurality of split plates 50 included in the second split-plate group 502 according to one embodiment, surfaces 51*s* facing the axial upstream side Da1 in the one-side overlapping portions 51*a* and surfaces 50*s* facing the axial upstream side Da1 in a region on the other side in the circumferential direction Dc from the one-side overlapping portions 51*a* may be flush with each other.

In addition, in the plurality of split plates 50 included in the second split-plate group 502 according to one embodiment, surfaces 541*s*(surfaces 51*s*) facing the axial upstream side Da1 in the one-side fourth overlapping portions 541 (one-side overlapping portions 51*a*) of the fourth split plates 540 and surfaces 530*s*(surfaces 50*s*) facing the axial upstream side Da1 in the third split plates 530 may be flush with each other.

As a result, as will be described later, in a step of attaching the upper-half portion 111U of the blade ring 111 in which the plurality of stator blades 31 are retained to the upper-half portion 40U of the seal-ring retention ring 40 attached to the turbine 3, the leg portion 34 is less likely to be caught on the split plate 50, and the upper-half portion 111U of the blade ring 111 can be smoothly accommodated.

Here, operations and effects of the turbine blade ring assembly 110 according to one embodiment will be described.

In the turbine blade ring assembly 110 according to one embodiment, during assembly of the turbine 3, as shown in FIG. 4, there is a step of attaching the upper-half portion 111U of the blade ring 111 in which the plurality of stator blades 31 are retained to the upper-half portion 40U of the seal-ring retention ring 40 attached to the turbine 3.

In this step, the leg portion 34 protruding from the inner shroud 33 to the radial inner side overlaps and is fitted to the split plate 50 in the radial direction Dr while pressing and moving the split plate 50 in the axial direction Da against a biasing force of the biasing spring 75. In this case, the leg portion 34 presses the split plates 50 in the axial direction Da in order from a split plate 50 positioned at a position close to a horizontal split surface 5P.

Therefore, in a turbine blade ring in the related art, in the above step, the leg portion 34 may be caught and stranded on the split plate 50, and the upper-half portion 111U of the blade ring 111 may not be capable of being smoothly accommodated. Therefore, implementation of the above step may take time.

According to the turbine blade ring assembly 110 according to one embodiment, in a case where the blade ring 111 (upper-half portion 111U) in which the plurality of stator blades 31 are retained is attached from the radial outer side of the seal-ring retention ring 40 retaining the plurality of split plates 50 disposed in the circumferential direction Dc, the leg portion 34 presses the second split plates 520 disposed at the positions close to the end portion on the one side in the circumferential direction Dc of the seal-ring retention ring 40 in the axial direction Da before the first split plates 510 in the first split-plate group 501. Here, the one-side first overlapping portions 511 abut against the other-side second overlapping portions 522 via the first split plates 510 being biased by the biasing spring 75. Therefore, when the leg portion 34 presses and moves the second split plates 520 in the axial direction Da against the biasing force of the biasing spring 75, the other-side second overlapping portions 522 press the one-side first overlapping portions 511 in the axial direction Da. Therefore, a risk of the leg portion 34 being caught and stranded on the first split plates 510 can be reduced.

Similarly, in a case where the blade ring 111 (upper-half portion 111U) in which the plurality of stator blades 31 are retained is attached from the radial outer side of the seal-ring retention ring 40 retaining the plurality of split plates 50 disposed in the circumferential direction Dc, the leg portion 34 presses the fourth split plates 540 disposed at the positions close to the end portion on the other side in the circumferential direction Dc of the seal-ring retention ring 40 in the axial direction Da before the third split plates 530 in the second split-plate group 502. Here, the other-side third overlapping portions 532 abut against the one-side fourth overlapping portions 541 via the third split plates 530 being biased by the biasing spring 75. Therefore, when the leg portion 34 presses and moves the fourth split plates 540 in the axial direction Da against the biasing force of the biasing spring 75, the one-side fourth overlapping portions 541 press the other-side third overlapping portions 532 in the axial direction Da. Therefore, a risk of the leg portion 34 being caught and stranded on the third split plates 530 can be reduced.

Therefore, according to the turbine blade ring assembly 110 according to one embodiment, in a case where the blade ring 111 is attached to the seal-ring retention ring 40, a risk of the leg portion 34 being caught and stranded on the split plate 50 can be reduced. Therefore, a time required for work of integrating the seal-ring retention ring 40 and the blade ring 111 can be shortened. Accordingly, assembly work of the turbine 3 can be efficiently performed.

In the turbine blade ring assembly 110 according to one embodiment, at least one of the first split plates 510 may have the same shape as at least one of the second split plates 520. At least one of the third split plates 530 may have the same shape as at least one of the fourth split plates 540.

Accordingly, commonization of components in the turbine blade ring assembly 110 can be achieved, and manufacturing costs can be reduced.

In the turbine blade ring assembly 110 according to one embodiment, at least one of the first split plates 510 may have a shape that is plane-symmetrical to at least one of the third split plates 530.

Accordingly, a difference in the shape of the split plate 50 between the first split-plate group 501 and the second split-plate group 502 can be reduced, and a difference in a performance such as a sealing performance with the leg portion 34 between the first split-plate group 501 and the second split-plate group 502 or a difference in assemblability can be reduced.

Similarly, in the turbine blade ring assembly 110 according to one embodiment, at least one of the second split plates 520 may have a shape that is plane-symmetrical to at least one of the fourth split plates 540.

Accordingly, the difference in the shape of the split plate 50 between the first split-plate group 501 and the second split-plate group 502 can be reduced, and the difference in the performance such as the sealing performance with the leg portion 34 between the first split-plate group 501 and the second split-plate group 502 or the difference in assemblability can be reduced.

In the turbine blade ring assembly 110 according to one embodiment, as described above, the one-side first overlapping portions 511 and the other-side second overlapping portions 522 are shiplap-joined to be capable of being separated from each other or abutted against each other, and the other-side third overlapping portions 532 and the one-side fourth overlapping portions 541 are shiplap-joined to be capable of being separated from each other or abutted against each other.

Accordingly, a sealing performance between the one-side first overlapping portions 511 and the other-side second overlapping portions 522 and a sealing performance between the other-side third overlapping portions 532 and the one-side fourth overlapping portions 541 can be improved with a relatively simple structure.

In the turbine blade ring assembly 110 according to one embodiment, the plurality of split plates 50 may be disposed in the circumferential direction Dc from an end portion 40*a* on the one side to an end portion 40*b* on the other side in the circumferential direction Dc of the seal-ring retention ring 40.

Accordingly, the risk of the leg portion 34 being caught and stranded on the split plate 50 when the blade ring 111 is attached to the seal-ring retention ring 40 can be reduced over the entire circumferential direction Dc of the seal-ring retention ring 40.

The turbine blade ring assembly 110 according to one embodiment described above may be an upper-half portion (upper-half portion 110U) of the turbine blade ring 105.

In a case where the upper-half portion 111U of the blade ring 111 in which the plurality of stator blades 31 are retained is attached from a radial outer side of the upper-half portion 40U of the seal-ring retention ring 40 retaining the plurality of split plates 50 disposed in the circumferential direction Dc, rotor blade stages are present on the one side and the other side in the axial direction Da with the upper-half portion 40U of the seal-ring retention ring 40 interposed therebetween. Therefore, in a case where the leg portion 34 is caught on the split plate 50, a rotor blade row gets in the way, and thus correction is difficult.

According to the turbine blade ring assembly 110 according to one embodiment, when the upper-half portion 111U of the blade ring 111, which is difficult to be corrected as described above, is attached, the risk of the leg portion 34 being caught and stranded on the split plate 50 can be reduced. Therefore, an effect of reducing the risk is further increased.

(Regarding Fifth Split Plate 550)

In the turbine blade ring assembly 110 according to one embodiment, the plurality of split plates 50 may include a fifth split plate 550 that is disposed between the first split-plate group 501 and the second split-plate group 502, that is, between the first split plate 510 and the third split plate 530. The fifth split plate 550 may have a one-side fifth overlapping portion 551 overlapping the first split plate 510 in the circumferential direction Dc, and an other-side fifth overlapping portion 552 overlapping the third split plate 530 in the circumferential direction Dc.

The first split plate 510 adjacent to the fifth split plate 550 in the circumferential direction Dc may have an other-side first overlapping portion 512 overlapping the fifth split plate 550 in the circumferential direction Dc.

The third split plate 530 adjacent to the fifth split plate 550 in the circumferential direction Dc may have a one-side third overlapping portion 531 overlapping the fifth split plate 550 in the circumferential direction Dc.

The one-side fifth overlapping portion 551 may abut against the other-side first overlapping portion 512 of the first split plate 510 adjacent to the fifth split plate 550 in the circumferential direction Dc via the fifth split plate 550 being biased by the biasing spring 75. The other-side fifth overlapping portion 552 may abut against the one-side third overlapping portion 531 of the third split plate 530 adjacent to the fifth split plate 550 in the circumferential direction Dc via the fifth split plate 550 being biased by the biasing spring 75.

Accordingly, in a case where the blade ring 111 (upper-half portion 111U) in which the plurality of stator blades 31 are retained is attached from the radial outer side of the seal-ring retention ring 40 retaining the plurality of split plates 50 disposed in the circumferential direction Dc, the leg portion 34 presses the first split plate 510 adjacent to the fifth split plate 550 in the circumferential direction Dc in the axial direction Da before the fifth split plate 550. Here, the one-side fifth overlapping portion 551 abuts against the other-side first overlapping portion 512 via the fifth split plate 550 being biased by the biasing spring 75. Therefore, when the leg portion 34 presses and moves the first split plate 510 in the axial direction Da against the biasing force of the biasing spring 75, the other-side first overlapping portion 512 presses the one-side fifth overlapping portion 551 in the axial direction Da. Therefore, a risk of the leg portion 34 being caught and stranded on the fifth split plate 550 can be reduced.

Similarly, in a case where the blade ring 111 (upper-half portion 111U) in which the plurality of stator blades 31 are retained is attached from the radial outer side of the seal-ring retention ring 40 retaining the plurality of split plates 50 disposed in the circumferential direction Dc, the leg portion 34 presses the third split plate 530 adjacent to the fifth split plate 550 in the circumferential direction Dc in the axial direction Da before the fifth split plate 550. Here, the other-side fifth overlapping portion 552 abuts against the one-side third overlapping portion 531 via the fifth split plate 550 being biased by the biasing spring 75. Therefore, when the leg portion 34 presses and moves the third split plate 530 in the axial direction Da against the biasing force of the biasing spring 75, the one-side third overlapping portion 531 presses the other-side fifth overlapping portion 552 in the axial direction Da. Therefore, a risk of the leg portion 34 being caught and stranded on the fifth split plate 550 can be reduced.

Therefore, according to the turbine blade ring assembly 110 according to one embodiment, in a case where the blade ring 111 is attached to the seal-ring retention ring 40, the risk of the leg portion 34 being caught and stranded on the fifth split plate 550 can be reduced. Therefore, a time required for work of attaching the blade ring 111 to the seal-ring retention ring 40 can be shortened. Accordingly, assembly work of the turbine 3 can be efficiently performed.

In the turbine blade ring assembly 110 according to one embodiment, the fifth split plate 550 may be disposed between a position (for example, a position of 30 degrees in FIG. 4) 30 degrees away from a central position (for example, the position of 0 degrees in FIG. 4) of the seal-ring retention ring 40 in the circumferential direction Dc toward the one side in the circumferential direction Dc and a position (for example, a position of 330 degrees in FIG. 4) 30 degrees away from the central position of the seal-ring retention ring 40 in the circumferential direction Dc toward the other side in the circumferential direction Dc.

As a result of diligent study by the present inventors, it has been found that a region where the risk of the leg portion 34 being caught and stranded on the split plate 50 when the blade ring 111 is attached to the seal-ring retention ring 40 is relatively high is in a vicinity of a position (for example, a position of 45 degrees or a position of 315 degrees in FIG. 4) 45 degrees away from the central position (for example, the position of 0 degrees in FIG. 4) of the seal-ring retention ring 40 in the circumferential direction Dc toward the one side or the other side in the circumferential direction Dc.

According to the turbine blade ring assembly 110 according to one embodiment, in the region where the risk of the leg portion 34 being caught and stranded on the split plate 50 when the blade ring 111 is attached to the seal-ring retention ring 40 is relatively high, the split plate 50 of the first split-plate group 501 or the second split-plate group 502 is disposed, instead of the fifth split plate 550. Accordingly, the above risk can be reduced.

In the turbine blade ring assembly 110 according to one embodiment, the one-side fifth overlapping portion 551 of the fifth split plate 550 and the other-side first overlapping portion 512 of the first split plate 510 adjacent to the fifth split plate 550 in the circumferential direction Dc may be shiplap-joined to be capable of being separated from each other or abutted against each other.

Similarly, in the turbine blade ring assembly 110 according to one embodiment, the other-side fifth overlapping portion 552 of the fifth split plate 550 and the one-side third overlapping portion 531 of the third split plate 530 adjacent to the fifth split plate 550 in the circumferential direction Dc may be shiplap-joined to be capable of being separated from each other or abutted against each other.

The one-side fifth overlapping portion 551 of the fifth split plate 550 and the other-side first overlapping portion 512 of the first split plate 510 adjacent to the fifth split plate 550 in the circumferential direction Dc protrude toward each other in the circumferential direction Dc to configure a halving joint. The one-side fifth overlapping portion 551 has a shape in which the axial upstream side Da1 is cut out, and the other-side first overlapping portion 512 of the first split plate 510 adjacent to the fifth split plate 550 in the circumferential direction Dc has a shape in which the axial downstream side Da2 is cut out.

The other-side fifth overlapping portion 552 of the fifth split plate 550 and the one-side third overlapping portion 531 of the third split plate 530 adjacent to the fifth split plate 550 in the circumferential direction Dc protrude toward each other in the circumferential direction Dc to configure a halving joint. The other-side fifth overlapping portion 552 has a shape in which the axial upstream side Da1 is cut out, and the one-side third overlapping portion 531 of the third split plate 530 adjacent to the fifth split plate 550 in the circumferential direction Dc has a shape in which the axial downstream side Da2 is cut out.

Accordingly, a sealing performance between the one-side fifth overlapping portion 551 and the other-side first overlapping portion 512 and a sealing performance between the other-side fifth overlapping portion 552 and the one-side third overlapping portion 531 can be improved with a relatively simple structure.

The one-side fifth overlapping portion 551 of the fifth split plate 550 and the other-side first overlapping portion 512 of the first split plate 510 adjacent to the fifth split plate 550 in the circumferential direction Dc may be formed to configure an inclination joint having an inclined surface inclined such that a dimension in the axial direction Da gradually decreases toward an end portion side in the circumferential direction Dc.

Similarly, the other-side fifth overlapping portion 552 of the fifth split plate 550 and the one-side third overlapping portion 531 of the third split plate 530 adjacent to the fifth split plate 550 in the circumferential direction Dc may be formed to configure an inclination joint having an inclined surface inclined such that a dimension in the axial direction Da gradually decreases toward an end portion side in the circumferential direction Dc.

(Method for Assembling Turbine 3)

Figure 6:
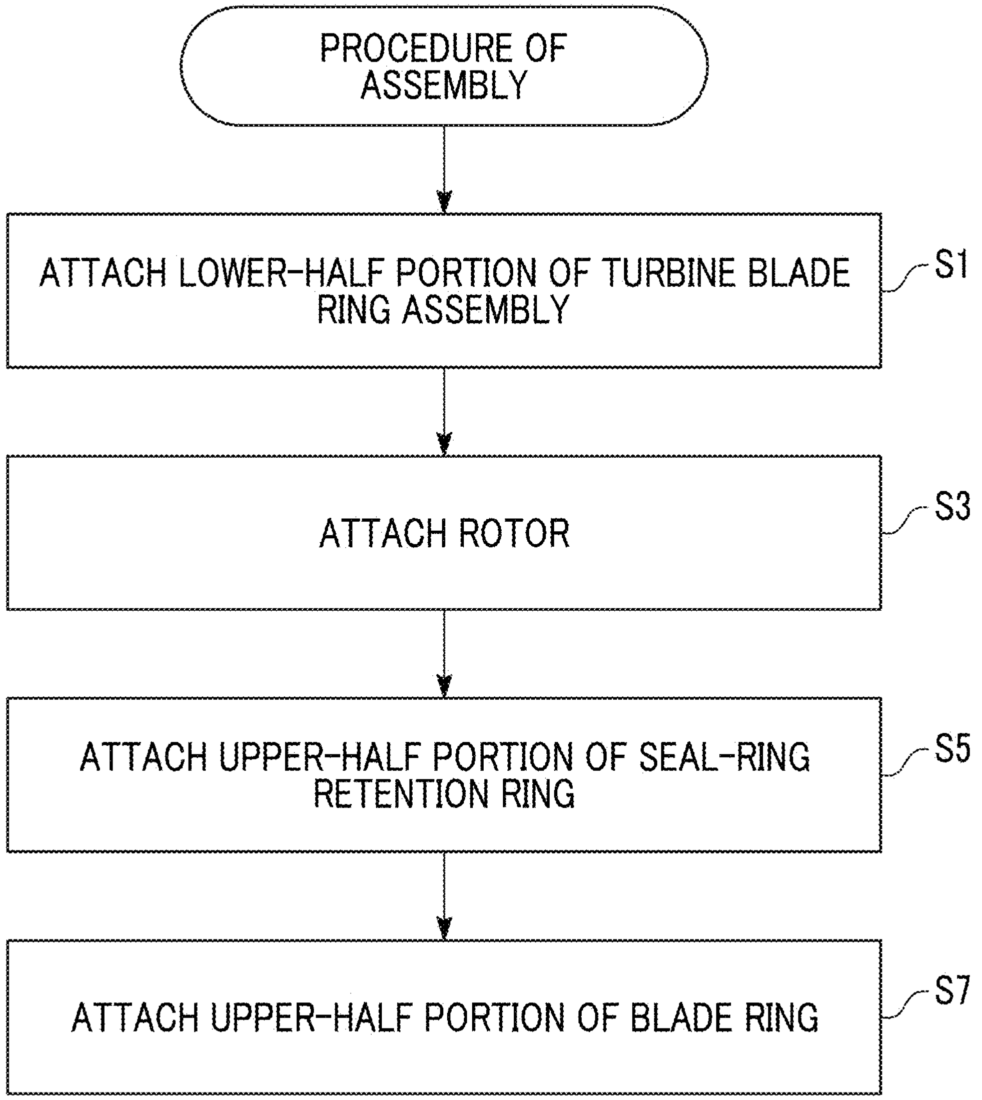
FIG. 6 is a flowchart showing a procedure of a method for assembling a turbine including the turbine blade ring assembly according to one embodiment.

FIG. 6 is a flowchart showing a procedure of a method for assembling the turbine 3 including the turbine blade ring assembly 110 according to one embodiment described above.

The method for assembling the turbine 3 according to one embodiment includes step S1 of attaching the lower-half portion 110D of the turbine blade ring assembly 110, step S3 of attaching the rotor 10, step S5 of attaching the upper-half portion 40U of the seal-ring retention ring 40, and step S7 of attaching the upper-half portion 111U of the blade ring 111.

(Step S1 of Attaching Lower-Half Portion 110D of Turbine Blade Ring Assembly 110)

Step S1 of attaching the lower-half portion 110D of the turbine blade ring assembly 110 is a step of attaching the lower-half portion 110D of the turbine blade ring assembly 110 to a casing lower half 5D of the turbine 3.

In step S1 of attaching the lower-half portion 110D of the turbine blade ring assembly 110, the lower-half portion 40D of the seal-ring retention ring 40 is attached to the lower-half portion 111D of the blade ring 111 in which the plurality of stator blades 31 are retained at a location different from an installation location of the casing lower half 5D of the turbine 3. In the lower-half portion 110D of the turbine blade ring assembly 110 according to one embodiment, the lower-half portion 40D of the seal-ring retention ring 40 may have the same configuration as that of the upper-half portion 110U of the turbine blade ring assembly 110 according to one embodiment described above.

Thereafter, the lower-half portion 110D of the turbine blade ring assembly 110 in which the lower-half portion 111D of the blade ring 111 and the lower-half portion 40D of the seal-ring retention ring 40 are integrated with each other is attached to the casing lower half 5D of the turbine 3.

(Step S3 of Attaching Rotor 10)

Step S3 of attaching the rotor 10 is a step of attaching the rotor 10 to the casing lower half 5D of the turbine 3 to which the lower-half portion 110D of the turbine blade ring assembly 110 is attached.

In step S3 of attaching the rotor 10, the rotor 10 having the plurality of stages of rotor disks 11 and the plurality of rotor blades 21 fixed to each stage of the rotor disks 11 as described above is attached to the casing lower half 5D of the turbine 3.

(Step S5 of Attaching Upper-Half Portion 40U of Seal-Ring Retention Ring 40)

Step S5 of attaching the upper-half portion 40U of the seal-ring retention ring 40 is a step of attaching the upper-half portion 40U of the seal-ring retention ring 40 to the casing lower half 5D of the turbine 3 to which the rotor 10 is attached. That is, step S5 of attaching the upper-half portion 40U of the seal-ring retention ring 40 is a step of attaching the upper-half portion 40U of the seal-ring retention ring 40 including the plurality of split plates 50 disposed in the circumferential direction Dc and the plurality of biasing springs 75 that bias the plurality of split plates 50 in the axial direction Da to the casing lower half 5D to which the lower-half portion 110D of the turbine blade ring assembly 110 including the blade ring 111 (lower-half portion 111D) in which the plurality of stator blades 31 are retained and the lower-half portion 40D of the seal-ring retention ring 40 is attached.

In step S5 of attaching the upper-half portion 40U of the seal-ring retention ring 40, the upper-half portion 40U of the seal-ring retention ring 40 according to one embodiment described above is attached to the lower-half portion 40D of the seal-ring retention ring 40 attached to the casing lower half 5D of the turbine 3.

(Step S7 of Attaching Upper-Half Portion 111U of Blade Ring 111)

As shown in FIG. 4, step S7 of attaching the upper-half portion 111U of the blade ring 111 is a step of attaching the upper-half portion 111U of the blade ring 111 in which the plurality of stator blades 31 are retained to the upper-half portion 40U of the seal-ring retention ring 40 attached to the casing lower half 5D.

In step S7 of attaching the upper-half portion 111U of the blade ring 111, the leg portion 34 of the stator blade 31 retained by the upper-half portion 111U of the blade ring 111 presses the second split plates 520 positioned at the positions close to the end portion on the one side in the circumferential direction Dc of the upper-half portion 40U of the seal-ring retention ring 40 in the axial direction Da before the first split plates 510 in the first split-plate group 501. Here, the one-side first overlapping portions 511 abut against the other-side second overlapping portions 522 via the first split plates 510 being biased by the biasing spring 75. Therefore, when the leg portion 34 presses and moves the second split plates 520 in the axial direction Da against the biasing force of the biasing spring 75, the other-side second overlapping portions 522 press the one-side first overlapping portions 511 in the axial direction Da. Therefore, a risk of the leg portion 34 being caught and stranded on the first split plates 510 can be reduced.

Similarly, in step S7 of attaching the upper-half portion 111U of the blade ring 111, the leg portion 34 of the stator blade 31 retained by the upper-half portion 111U of the blade ring 111 presses the fourth split plates 540 positioned at the positions close to the end portion on the other side in the circumferential direction Dc of the upper-half portion 40U of the seal-ring retention ring 40 in the axial direction Da before the third split plates 530 in the second split-plate group 502. Here, the other-side third overlapping portions 532 abut against the one-side fourth overlapping portions 541 via the third split plates 530 being biased by the biasing spring 75. Therefore, when the leg portion 34 presses and moves the fourth split plates 540 in the axial direction Da against the biasing force of the biasing spring 75, the one-side fourth overlapping portions 541 press the other-side third overlapping portions 532 in the axial direction Da. Therefore, a risk of the leg portion 34 being caught and stranded on the third split plates 530 can be reduced.

Therefore, according to the method for assembling the turbine 3 according to one embodiment, the risk of the leg portion 34 being caught and stranded on the split plate 50 can be reduced in step S7 of attaching the upper-half portion 111U of the blade ring 111. Therefore, a time required for performing step S7 of attaching the upper-half portion 111U of the blade ring 111 can be shortened. Accordingly, assembly work of the turbine 3 can be efficiently performed.

The present disclosure is not limited to the above-described embodiments, and includes a modification of the above-described embodiments and an appropriate combination of the embodiments.

For example, the contents described in each embodiment are understood as follows.

(1) A turbine blade ring assembly according to at least one embodiment of the present disclosure includes a blade ring 111 having an arc shape, a plurality of stator blades 31 retained by the blade ring 111, a seal-ring retention ring 40 having an arc shape, a plurality of split plates 50 retained by the seal-ring retention ring 40 and disposed in a circumferential direction Dc, and a plurality of biasing springs 75 that bias the plurality of split plates 50 in an axial direction Da. The plurality of stator blades 31 have protrusion portions (leg portions 34) protruding to a radial inner side. The plurality of biasing springs 75 bias the plurality of split plates 50 to abut against the protrusion portions (leg portions 34). The plurality of split plates 50 include a first split-plate group 501 in which the plurality of split plates 50 are disposed in the circumferential direction Dc on one side in the circumferential direction Dc of the seal-ring retention ring 40, and a second split-plate group 502 in which the plurality of split plates 50 are disposed in the circumferential direction Dc on the other side in the circumferential direction Dc of the seal-ring retention ring 40. The plurality of split plates 50 constituting the first split-plate group 501 include first split plates 510, and second split plates 520 disposed at positions close to an end portion on the one side in the circumferential direction Dc of the seal-ring retention ring 40 with respect to the first split plates 510 and adjacent to the first split plates 510 in the circumferential direction Dc. The first split plates 510 have one-side first overlapping portions 511 overlapping the second split plates 520 in the circumferential direction Dc. The second split plates 520 have other-side second overlapping portions 522 overlapping the one-side first overlapping portions 511 in the circumferential direction Dc. The one-side first overlapping portions 511 abut against the other-side second overlapping portions 522 via the first split plates 510 being biased by the biasing spring 75. The plurality of split plates 50 constituting the second split-plate group 502 include third split plates 530, and fourth split plates 540 disposed at positions close to an end portion on the other side in the circumferential direction Dc of the seal-ring retention ring 40 with respect to the third split plates 530 and adjacent to the third split plates 530 in the circumferential direction Dc. The third split plates 530 have other-side third overlapping portions 532 overlapping the fourth split plates 540 in the circumferential direction Dc. The fourth split plates 540 have one-side fourth overlapping portions 541 overlapping the other-side third overlapping portions 532 in the circumferential direction Dc. The other-side third overlapping portions 532 abut against the one-side fourth overlapping portions 541 via the third split plates 530 being biased by the biasing spring 75.

According to a configuration of (1) above, in a case where the blade ring 111 in which the plurality of stator blades 31 are retained is attached from the radial outer side of the seal-ring retention ring 40 retaining the plurality of split plates 50 disposed in the circumferential direction Dc, the protrusion portion (leg portion 34) presses the second split plates 520 disposed at the positions close to the end portion on the one side in the circumferential direction Dc of the seal-ring retention ring 40 in the axial direction Da before the first split plates 510 in the first split-plate group 501. Here, the one-side first overlapping portions 511 abut against the other-side second overlapping portions 522 via the first split plates 510 being biased by the biasing spring 75. Therefore, when the protrusion portion (leg portion 34) presses and moves the second split plates 520 in the axial direction Da against the biasing force of the biasing spring 75, the other-side second overlapping portions 522 press the one-side first overlapping portions 511 in the axial direction Da. Therefore, a risk of the protrusion portion (leg portion 34) being caught and stranded on the first split plates 510 can be reduced.

In addition, according to the configuration of (1) above, in a case where the blade ring 111 in which the plurality of stator blades 31 are retained is attached from the radial outer side of the seal-ring retention ring 40 retaining the plurality of split plates 50 disposed in the circumferential direction Dc, the protrusion portion (leg portion 34) presses the fourth split plates 540 disposed at the positions close to the end portion on the other side in the circumferential direction Dc of the seal-ring retention ring 40 in the axial direction Da before the third split plates 530 in the second split-plate group 502. Here, the other-side third overlapping portions 532 abut against the one-side fourth overlapping portions 541 via the third split plates 530 being biased by the biasing spring 75. Therefore, when the protrusion portion (leg portion 34) presses and moves the fourth split plates 540 in the axial direction Da against the biasing force of the biasing spring 75, the one-side fourth overlapping portions 541 press the other-side third overlapping portions 532 in the axial direction Da. Therefore, a risk of the protrusion portion (leg portion 34) being caught and stranded on the third split plates 530 can be reduced.

Therefore, according to the configuration of (1) above, in a case where the blade ring 111 is attached to the seal-ring retention ring 40, a risk of the protrusion portion (leg portion 34) being caught and stranded on the split plate 50 can be reduced. Therefore, the time required for the work of integrating the seal-ring retention ring 40 and the blade ring 111 can be shortened. Accordingly, assembly work of a turbine can be efficiently performed.

(2) In some embodiments, in the configuration of (1) above, at least one of the first split plates 510 may have the same shape as at least one of the second split plates 520. At least one of the third split plates 530 may have the same shape as at least one of the fourth split plates 540.

According to a configuration of (2) above, commonization of the components in the turbine blade ring assembly 110 can be achieved, and manufacturing costs can be reduced.

(3) In some embodiments, in the configuration of (1) or (2) above, at least one of the first split plates 510 may have a shape that is plane-symmetrical to at least one of the third split plates 530.

According to a configuration of (3) above, the difference in the shape of the split plate 50 between the first split-plate group 501 and the second split-plate group 502 can be reduced, and a difference in a performance such as a sealing performance with the protrusion portion (leg portion 34) between the first split-plate group 501 and the second split-plate group 502 or a difference in assemblability can be reduced.

(4) In some embodiments, in the configuration of any one of (1) to (3) above, the plurality of split plates 50 may include a fifth split plate 550 disposed between the first split plate 510 and the third split plate 530. The fifth split plate 550 may have a one-side fifth overlapping portion 551 overlapping the first split plate 510 in the circumferential direction Dc, and an other-side fifth overlapping portion 552 overlapping the third split plate 530 in the circumferential direction Dc. The first split plate 510 may have an other-side first overlapping portion 512 overlapping the fifth split plate 550 in the circumferential direction Dc. The third split plate 530 may have a one-side third overlapping portion 531 overlapping the fifth split plate 550 in the circumferential direction Dc. The one-side fifth overlapping portion 551 may abut against the other-side first overlapping portion 512 via the fifth split plate 550 being biased by the biasing spring 75. The other-side fifth overlapping portion 552 may abut against the one-side third overlapping portion 531 via the fifth split plate 550 being biased by the biasing spring 75.

According to a configuration of (4) above, in a case where the blade ring 111 in which the plurality of stator blades 31 are retained is attached from the radial outer side of the seal-ring retention ring 40 retaining the plurality of split plates 50 disposed in the circumferential direction Dc, the protrusion portion (leg portion 34) presses the first split plate 510 in the axial direction Da before the fifth split plate 550. Here, the one-side fifth overlapping portion 551 abuts against the other-side first overlapping portion 512 via the fifth split plate 550 being biased by the biasing spring 75. Therefore, when the protrusion portion (leg portion 34) presses and moves the first split plate 510 in the axial direction Da against the biasing force of the biasing spring 75, the other-side first overlapping portion 512 presses the one-side fifth overlapping portion 551 in the axial direction Da. Therefore, a risk of the protrusion portion (leg portion 34) being caught and stranded on the fifth split plate 550 can be reduced.

In addition, according to the configuration of (4) above, in a case where the blade ring 111 in which the plurality of stator blades 31 are retained is attached from the radial outer side of the seal-ring retention ring 40 retaining the plurality of split plates 50 disposed in the circumferential direction Dc, the protrusion portion (leg portion 34) presses the third split plate 530 in the axial direction Da before the fifth split plate 550. Here, the other-side fifth overlapping portion 552 abuts against the one-side third overlapping portion 531 via the fifth split plate 550 being biased by the biasing spring 75. Therefore, when the protrusion portion (leg portion 34) presses and moves the third split plate 530 in the axial direction Da against the biasing force of the biasing spring 75, the one-side third overlapping portion 531 presses the other-side fifth overlapping portion 552 in the axial direction Da. Therefore, the risk of the protrusion portion (leg portion 34) being caught and stranded on the fifth split plate 550 can be reduced.

Therefore, according to the configuration of (4) above, in a case where the blade ring 111 is attached to the seal-ring retention ring 40, the risk of the protrusion portion (leg portion 34) being caught and stranded on the fifth split plate 550 can be reduced. Therefore, the time required for the work of integrating the seal-ring retention ring 40 and the blade ring 111 can be shortened. Accordingly, assembly work of the turbine 3 can be efficiently performed.

(5) In some embodiments, in the configuration of (4) above, the fifth split plate 550 may be disposed between a position 30 degrees away from a central position of the seal-ring retention ring 40 in the circumferential direction Dc toward the one side in the circumferential direction Dc and a position 30 degrees away from the central position of the seal-ring retention ring 40 in the circumferential direction Dc toward the other side in the circumferential direction Dc.

As a result of diligent study by the present inventors, it has been found that a region where the risk of the protrusion portion (leg portion 34) being caught and stranded on the split plate 50 when the blade ring 111 is attached to the seal-ring retention ring 40 is relatively high is in the vicinity of the position 45 degrees away from the central position of the seal-ring retention ring 40 in the circumferential direction Dc toward the one side or the other side in the circumferential direction Dc.

According to a configuration of (5) above, in the region where the risk of the protrusion portion (leg portion 34) being caught and stranded on the split plate 50 when the blade ring 111 is attached to the seal-ring retention ring 40 is relatively high, the split plate 50 of the first split-plate group 501 or the second split-plate group 502 is disposed, instead of the fifth split plate 550. Accordingly, the above risk can be reduced.

(6) In some embodiments, in the configuration of any one of (1) to (5) above, the one-side first overlapping portions 511 and the other-side second overlapping portions 522 may be shiplap-joined to be capable of being separated from each other or abutted against each other.

According to a configuration of (6) above, the sealing performance between the one-side first overlapping portions 511 and the other-side second overlapping portions 522 can be improved with a relatively simple structure.

(7) In some embodiments, in the configuration of any one of (1) to (6) above, the plurality of split plates 50 may be disposed in the circumferential direction Dc from the end portion on the one side to the end portion on the other side in the circumferential direction Dc of the seal-ring retention ring 40.

According to a configuration of (7) above, the risk of the protrusion portion (leg portion 34) being caught and stranded on the split plate 50 when the blade ring 111 is attached to the seal-ring retention ring 40 can be reduced over the entire circumferential direction Dc of the seal-ring retention ring 40.

(8) In some embodiments, in the configuration of any one of (1) to (7) above, the turbine blade ring assembly 110 may be an upper-half portion (upper-half portion 110U) of a turbine blade ring 105.

In a case where the upper-half portion 111U of the blade ring 111 in which the plurality of stator blades 31 are retained is attached from a radial outer side of the upper-half portion 40U of the seal-ring retention ring 40 retaining the plurality of split plates 50 disposed in the circumferential direction Dc, the rotor blade stages are present on the one side and the other side in the axial direction Da with the upper-half portion 40U of the seal-ring retention ring 40 interposed therebetween. Therefore, in a case where the protrusion portion (leg portion 34) is caught on the split plate 50, the rotor blade row gets in the way, and thus correction is difficult.

According to a configuration of (8) above, when the upper-half portion 111U of the blade ring 111, which is difficult to be corrected as described above, is attached, the risk of the protrusion portion (leg portion 34) being caught and stranded on the split plate 50 can be reduced. Therefore, an effect of reducing the risk is further increased.

(9) A method for assembling a turbine according to at least one embodiment of the present disclosure includes a step (S5) of attaching a seal-ring retention ring upper-half portion (upper-half portion 40U) including a plurality of split plates 50 disposed in a circumferential direction Dc and a plurality of biasing springs 75 that bias the plurality of split plates 50 in an axial direction Da to a casing lower half 5D to which a turbine blade ring lower-half portion (lower-half portion 110D) including a blade ring 111 in which a plurality of stator blades 31 are retained and a seal-ring retention ring 40 is attached. The method for assembling a turbine according to at least one embodiment of the present disclosure includes a step (S7) of attaching a blade ring upper-half portion (upper-half portion 111U) in which the plurality of stator blades 31 are retained to the seal-ring retention ring upper-half portion (upper-half portion 40U) attached to the casing lower half 5D. The plurality of stator blades 31 included in the blade ring upper-half portion (upper-half portion 111U) have protrusion portions (leg portions 34) protruding to a radial inner side. The plurality of biasing springs 75 included in the seal-ring retention ring upper-half portion (upper-half portion 40U) bias the plurality of split plates 50 included in the seal-ring retention ring upper-half portion (upper-half portion 40U) to abut against the protrusion portions (leg portions 34). The plurality of split plates 50 included in the seal-ring retention ring upper-half portion (upper-half portion 40U) include a first split-plate group 501 in which the plurality of split plates 50 are disposed in the circumferential direction Dc on one side in the circumferential direction Dc of the seal-ring retention ring 40, and a second split-plate group 502 in which the plurality of split plates 50 are disposed in the circumferential direction Dc on the other side in the circumferential direction Dc of the seal-ring retention ring 40. The plurality of split plates 50 constituting the first split-plate group 501 include first split plates 510, and second split plates 520 disposed at positions close to an end portion on the one side in the circumferential direction Dc of the seal-ring retention ring 40 with respect to the first split plates 510 and adjacent to the first split plates 510 in the circumferential direction Dc. The first split plates 510 have one-side first overlapping portions 511 overlapping the second split plates 520 in the circumferential direction Dc. The second split plates 520 have other-side second overlapping portions 522 overlapping the one-side first overlapping portions 511 in the circumferential direction Dc. The one-side first overlapping portions 511 abut against the other-side second overlapping portions 522 via the first split plates 510 being biased by the biasing spring 75. The plurality of split plates 50 constituting the second split-plate group 502 include third split plates 530, and fourth split plates 540 disposed at positions close to an end portion on the other side in the circumferential direction Dc of the seal-ring retention ring 40 with respect to the third split plates 530 and adjacent to the third split plates 530 in the circumferential direction Dc. The third split plates 530 have other-side third overlapping portions 532 overlapping the fourth split plates 540 in the circumferential direction Dc. The fourth split plates 540 have one-side fourth overlapping portions 541 overlapping the other-side third overlapping portions 532 in the circumferential direction Dc. The other-side third overlapping portions 532 abut against the one-side fourth overlapping portions 542 via the third split plates 530 being biased by the biasing spring 75.

According to the method of (9) above, in the step (S7) of attaching the blade ring upper-half portion (upper-half portion 111U), the protrusion portion (leg portion 34) presses the second split plates 520 positioned at the positions close to the end portion on the one side in the circumferential direction Dc of the seal-ring retention ring 40 in the axial direction Da before the first split plates 510 in the first split-plate group 501. Here, the one-side first overlapping portions 511 abut against the other-side second overlapping portions 522 via the first split plates 510 being biased by the biasing spring 75. Therefore, when the protrusion portion (leg portion 34) presses and moves the second split plates 520 in the axial direction Da against the biasing force of the biasing spring 75, the other-side second overlapping portions 522 press the one-side first overlapping portions 511 in the axial direction Da. Therefore, a risk of the protrusion portion (leg portion 34) being caught and stranded on the first split plates 510 can be reduced.

In addition, according to the method of (9) above, in the step (S7) of attaching the blade ring upper-half portion (upper-half portion 111U), the protrusion portion (leg portion 34) presses the fourth split plates 540 positioned at the positions close to the end portion on the other side in the circumferential direction Dc of the seal-ring retention ring 40 in the axial direction Da before the third split plates 530 in the second split-plate group 502. Here, the other-side third overlapping portions 532 abut against the one-side fourth overlapping portions 541 via the third split plates 530 being biased by the biasing spring 75. Therefore, when the protrusion portion (leg portion 34) presses and moves the fourth split plates 540 in the axial direction Da against the biasing force of the biasing spring 75, the one-side fourth overlapping portions 541 press the other-side third overlapping portions 532 in the axial direction Da. Therefore, a risk of the protrusion portion (leg portion 34) being caught and stranded on the third split plates 530 can be reduced.

Therefore, according to the method of (9) above, the risk of the protrusion portion (leg portion) 34 being caught and stranded on the split plate 50 can be reduced in the step (S7) of attaching the blade ring upper-half portion (upper-half portion 111U). Therefore, a time required for performing the step (S7) of attaching the blade ring upper-half portion (upper-half portion 111U) can be shortened. Accordingly, assembly work of the turbine 3 can be efficiently performed.

REFERENCE SIGNS LIST

3: turbine
5D: casing lower half
31: stator blade
34: leg portion (protrusion portion)
40: seal-ring retention ring
40D: lower-half portion
40U: upper-half portion
50: split plate
51: overlapping portion
51*a*: one-side overlapping portion
51*b*: other-side overlapping portion
51*c*: one-side overlapping portion
51*d*: other-side overlapping portion
75: biasing spring
100: gas turbine
105: turbine blade ring
110: turbine blade ring assembly
110D: lower-half portion
110U: upper-half portion
111: blade ring
111D: lower-half portion
111U: upper-half portion

501: first split-plate group
502: second split-plate group
510: first split plate
511: one-side first overlapping portion
512: other-side first overlapping portion
520: second split plate
521: one-side second overlapping portion
522: other-side second overlapping portion
530: third split plate
531: one-side third overlapping portion
532: other-side third overlapping portion
540: fourth split plate
541: one-side fourth overlapping portion
542: other-side fourth overlapping portion
550: fifth split plate
551: one-side fifth overlapping portion
552: other-side fifth overlapping portion

The invention claimed is:

1. A turbine blade ring assembly comprising:

a blade ring portion having an arc shape;

a plurality of stator blades retained by the blade ring portion;

a seal-ring retention ring portion having an arc shape;

a plurality of split plates retained by the seal-ring retention ring portion and disposed in a circumferential direction; and a plurality of biasing springs that bias the plurality of split plates in an axial direction, wherein the plurality of stator blades have protrusion portions protruding to a radial inner side, the plurality of biasing springs bias the plurality of split plates to abut against the protrusion portions, the plurality of split plates include a first split-plate group in which the plurality of split plates are disposed in the circumferential direction on one side in the circumferential direction of the seal-ring retention ring portion, and a second split-plate group in which the plurality of split plates are disposed in the circumferential direction on an other side in the circumferential direction of the seal-ring retention ring portion, the plurality of split plates constituting the first split-plate group include first split plates, and second split plates disposed at positions close to an end portion on the one side in the circumferential direction of the seal-ring retention ring portion with respect to the first split plates and adjacent to the first split plates in the circumferential direction, the first split plates have one-side first overlapping portions overlapping the second split plates in the circumferential direction, the second split plates have other-side second overlapping portions overlapping the one-side first overlapping portions in the circumferential direction, the one-side first overlapping portions abut against the other-side second overlapping portions via the first split plates being biased by corresponding biasing springs of the plurality of biasing springs, the plurality of split plates constituting the second split-plate group include third split plates, and fourth split plates disposed at positions close to an end portion on the other side in the circumferential direction of the seal-ring retention ring portion with respect to the third split plates and adjacent to the third split plates in the circumferential direction, the third split plates have other-side third overlapping portions overlapping the fourth split plates in the circumferential direction, the fourth split plates have one-side fourth overlapping portions overlapping the other-side third overlapping portions in the circumferential direction, and the other-side third overlapping portions abut against the one-side fourth overlapping portions via the third split plates being biased by corresponding biasing springs of the plurality of biasing springs.

2. The turbine blade ring assembly according to claim 1, wherein at least one of the first split plates has the same shape as at least one of the second split plates, and at least one of the third split plates has the same shape as at least one of the fourth split plates.

3. The turbine blade ring assembly according to claim 2, wherein at least one of the first split plates has a shape that is plane-symmetrical to at least one of the third split plates.

4. The turbine blade ring assembly according to claim 2, wherein the plurality of split plates include a fifth split plate disposed between one of the first split plates and one of the third split plates, the fifth split plate has a one-side fifth overlapping portion overlapping the one of the first split plates in the circumferential direction, and an other-side fifth overlapping portion overlapping the one of the third split plates in the circumferential direction, the one of the first split plates has an other-side first overlapping portion overlapping the fifth split plate in the circumferential direction, the one of the third split plates has a one-side third overlapping portion overlapping the fifth split plate in the circumferential direction, the one-side fifth overlapping portion abuts against the other-side first overlapping portion via the fifth split plate being biased by a corresponding biasing spring of the plurality of biasing springs, and the other-side fifth overlapping portion abuts against the one-side third overlapping portion via the fifth split plate being biased by the corresponding biasing spring of the plurality of biasing springs.

5. The turbine blade ring assembly according to claim 2, wherein the one-side first overlapping portions and the other-side second overlapping portions are shiplap-joined to be capable of being separated from each other or abutted against each other.

6. The turbine blade ring assembly according to claim 2, wherein the plurality of split plates are disposed in the circumferential direction from the end portion on the one side to the end portion on the other side in the circumferential direction of the seal-ring retention ring portion.

7. The turbine blade ring assembly according to claim 2, wherein the turbine blade ring assembly is an upper-half portion of a turbine blade ring.

8. The turbine blade ring assembly according to claim 1, wherein at least one of the first split plates has a shape that is plane-symmetrical to at least one of the third split plates.

9. The turbine blade ring assembly according to claim 1, wherein the plurality of split plates include a fifth split plate disposed between one of the first split plates and one of the third split plates, the fifth split plate has a one-side fifth overlapping portion overlapping the one of the first split plates in the circumferential direction, and an other-side fifth overlapping portion overlapping the one of the third split plates in the circumferential direction, the one of the first split plates has an other-side first overlapping portion overlapping the fifth split plate in the circumferential direction, the one of the third split plates has a one-side third overlapping portion overlapping the fifth split plate in the circumferential direction, the one-side fifth overlapping portion abuts against the other-side first overlapping portion via the fifth split plate being biased by a corresponding biasing spring of the plurality of biasing springs, and the other-side fifth overlapping portion abuts against the one-side third overlapping portion via the fifth split plate being biased by the corresponding biasing spring of the plurality of biasing springs.

10. The turbine blade ring assembly according to claim 9, wherein the fifth split plate is disposed between a position 30 degrees away from a central position of the seal-ring retention ring portion in the circumferential direction toward the one side in the circumferential direction and a position 30 degrees away from the central position of the seal-ring retention ring portion in the circumferential direction toward the other side in the circumferential direction.

11. The turbine blade ring assembly according to claim 1, wherein the one-side first overlapping portions and the other-side second overlapping portions are shiplap-joined to be capable of being separated from each other or abutted against each other.

12. The turbine blade ring assembly according to claim 1, wherein the plurality of split plates are disposed in the circumferential direction from the end portion on the one side to the end portion on the other side in the circumferential direction of the seal-ring retention ring portion.

13. The turbine blade ring assembly according to claim 1, wherein the turbine blade ring assembly is an upper-half portion of a turbine blade ring.

14. A method for assembling a turbine, the method comprising:

a step of attaching a seal-ring retention ring upper-half portion including a plurality of split plates disposed in a circumferential direction and a plurality of biasing springs that bias the plurality of split plates in an axial direction to a casing lower half to which a turbine blade ring lower-half portion is attached, the turbine blade ring lower-half portion including a blade ring lower-half portion in which a plurality of stator blades are retained and a seal-ring retention ring lower-half portion; and a step of attaching a turbine blade ring upper-half portion in which the plurality of stator blades are retained to the seal-ring retention ring upper-half portion attached to the casing lower half, wherein the plurality of stator blades included in the turbine blade ring upper-half portion have protrusion portions protruding to a radial inner side, the plurality of biasing springs included in the seal-ring retention ring upper-half portion bias the plurality of split plates included in the seal-ring retention ring upper-half portion to abut against the protrusion portions, the plurality of split plates included in the seal-ring retention ring upper-half portion include a first split-plate group in which the plurality of split plates are disposed in the circumferential direction on one side in the circumferential direction of the seal-ring retention ring upper-half portion, and a second split-plate group in which the plurality of split plates are disposed in the circumferential direction on an other side in the circumferential direction of the seal-ring retention ring upper-half portion, the plurality of split plates constituting the first split-plate group include first split plates, and second split plates disposed at positions close to an end portion on the one side in the circumferential direction of the seal-ring retention ring upper-half portion with respect to the first split plates and adjacent to the first split plates in the circumferential direction, the first split plates have one-side first overlapping portions overlapping the second split plates in the circumferential direction, the second split plates have other-side second overlapping portions overlapping the one-side first overlapping portions in the circumferential direction, the one-side first overlapping portions abut against the other-side second overlapping portions via the first split plates being biased by corresponding biasing springs of the plurality of biasing springs, the plurality of split plates constituting the second split-plate group include third split plates, and fourth split plates disposed at positions close to an end portion on the other side in the circumferential direction of the seal-ring retention ring upper-half portion with respect to the third split plates and adjacent to the third split plates in the circumferential direction, the third split plates have other-side third overlapping portions overlapping the fourth split plates in the circumferential direction, the fourth split plates have one-side fourth overlapping portions overlapping the other-side third overlapping portions in the circumferential direction, and the other-side third overlapping portions abut against the one-side fourth overlapping portions via the third split plates being biased by corresponding biasing springs of the plurality of biasing springs.

* * * * *